United States Patent
Nagata et al.

(10) Patent No.: US 7,290,730 B2
(45) Date of Patent: Nov. 6, 2007

(54) WEBBING RETRACTOR

(75) Inventors: Tomonori Nagata, Aichi-ken (JP);
Toshimasa Yamamoto, Aichi-ken (JP);
Hitoshi Takamatsu, Aichi-ken (JP);
Yasuho Kitazawa, Aichi-ken (JP);
Takeaki Kato, Aichi-ken (JP); Makoto Sekizuka, Toyota (JP); Shigekazu Imanaka, Toyota (JP); Kiyoka Matsubayashi, Aichi-ken (JP); Takuya Nezaki, Mizunami (JP)

(73) Assignees: Kabushiki Kaisha Tokai-Rika-Denki-Seisakusho, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 252 days.

(21) Appl. No.: 10/845,074

(22) Filed: May 14, 2004

(65) Prior Publication Data

US 2004/0227030 A1 Nov. 18, 2004

(30) Foreign Application Priority Data

May 16, 2003 (JP) ............................. 2003-138790

(51) Int. Cl.
*B65H 75/48* (2006.01)

(52) U.S. Cl. ...................... 242/374; 280/805

(58) Field of Classification Search ............... 242/374; 280/805; 297/472
See application file for complete search history.

(56) References Cited

U.S. PATENT DOCUMENTS

| 5,344,095 | A | * | 9/1994 | Frei ........................... 242/374 |
| 5,526,996 | A | * | 6/1996 | Ebner et al. ................. 242/374 |
| 5,788,176 | A | | 8/1998 | Ebner et al. |
| 6,443,380 | B1 | | 9/2002 | Biller et al. |

FOREIGN PATENT DOCUMENTS

| EP | 1155928 | 11/2001 |
| JP | 10-067300 | 3/1998 |
| JP | 2000-198413 | 7/2000 |

* cited by examiner

*Primary Examiner*—John Q. Nguyen
(74) *Attorney, Agent, or Firm*—Roberts, Mlotkowski & Hobbes; Thomas W. Cole

(57) ABSTRACT

A pinion of a pretensioner is provided at a side of a torsion shaft, which side is opposite a side connected integrally to a spool via a sleeve. A base lock of a lock mechanism is connected to the pinion. Due to the lock mechanism operating, a leg plate side end portion of the torsion shaft is locked. In this way, due to operation of the pretensioner, the pinion, which is connected to a rotating portion of a sleeve, also is locked by the locking mechanism. Therefore, a piston of the pretensioner is not lowered, and internal pressure of a cylinder does not affect deformation of the torsion shaft.

13 Claims, 9 Drawing Sheets

WEBBING RETRACTOR

CROSS-REFERENCE TO RELATED APPLICATION

This application claims priority under 35USC 119 from Japanese Patent Application No. 2003-138790, the disclosure of which is incorporated by reference herein.

BACKGROUND OF THE INVENTION

1. Field of the Invention

The present invention relates to a webbing retractor which structures a seat belt device of a vehicle or the like.

2. Description of the Related Art

A seat belt device which restrains, by an elongated, strip-shaped webbing belt, the body of a vehicle occupant who is seated in a seat of a vehicle, is equipped with a webbing retractor which is fixed to the vehicle body at the side of the seat. The webbing retractor has a spool whose axial direction runs, for example, substantially along the longitudinal direction of the vehicle. The proximal end side, in the longitudinal direction, of the webbing belt is anchored at the spool. The webbing belt is taken-up in layers around the outer peripheral portion of the spool.

An urging member, such as a torsion coil spring or the like, which urges the spool in a take-up direction in which the spool takes up the webbing belt, is provided at the webbing retractor. Due to the urging force of this urging member, the webbing belt is taken up and accommodated. Further, in the state in which the webbing belt is applied to the body of a vehicle occupant, slack or the like of the webbing belt is eliminated by the urging force of the urging member. In this type of webbing retractor, the webbing belt, which is wound on the spool, can be pulled out by the vehicle occupant pulling, against the urging force of the urging member, a tongue plate provided at the longitudinal direction intermediate portion of the webbing belt. The tongue plate is made to be held at a buckle device provided at the side of the seat which is opposite the side at which the webbing retractor is disposed. The webbing belt is thereby applied to the body of the vehicle occupant.

Usually, a pretensioner and a lock mechanism are provided in order to strongly restrain the body of the vehicle occupant when the vehicle rapidly decelerates or the like.

The pretensioner has a cylinder at whose interior a piston is accommodated so as to be freely slidable. A rack bar is provided at the piston. When the vehicle rapidly decelerates, a gas generating agent combusts, and gas is generated suddenly. In this way, the internal pressure of the cylinder rises, the piston slides, the rack bar meshes with a pinion which is mechanically connected to the spool, and the pinion rotates in the take-up direction.

A clutch mechanism is provided between the pinion and the spool. The clutch mechanism does not transmit the rotation of the spool to the pinion, but transmits the rotation of the pinion to the spool. When the pinion rotates in the take-up direction, the spool also rotates in the take-up direction.

At the time when the vehicle rapidly decelerates, the pretensioner rotates the spool in the take-up direction, such that the wiebbing belt is taken-up onto the spool and the force by which the webbing belt restrains the body of the vehicle occupant increases.

The lock mechanism has a base lock which rotates together with the spool, and an inertial plate which can rotate relative to the spool. A spring is interposed between the base lock and the inertial plate. When the base lock rotates together with the spool, the spring, which rotates together with the base lock, pushes the inertial plate or pulls the inertial plate and makes the inertial plate rotate following the rotation of the base lock.

An acceleration sensor is provided in a vicinity of the inertial plate. When a state of rapid deceleration of the vehicle arises, the acceleration sensor operates and restricts rotation of the inertial plate. At this time, due to the inertia at the time when the vehicle rapidly decelerates, the body of the vehicle occupant pulls the webbing belt such that the base lock is rotated in the pull-out direction via the spool, and relative rotation arises between the base lock and the inertial plate.

When such relative rotation arises, a lock member provided at the base lock is displaced, and meshes with internal ratchet teeth which are formed at the frame or the like of the webbing retractor. Rotation of the base lock in the pull-out direction is restricted, and accordingly, rotation of the spool in the pull-out direction is restricted. Due to the rotation being restricted, pulling-out of the webbing belt is impeded, and the body of the vehicle occupant can be reliably restrained and held by the webbing belt.

A force limiter mechanism is provided at the webbing retractor. When the body of the vehicle occupant pulls the webbing belt by a force of a predetermined magnitude or greater due to the inertia at the time when the vehicle rapidly decelerates, the force limiter mechanism permits a slight amount of pulling-out of the webbing belt while plastically deforming an energy absorbing member. The force limiter mechanism thereby absorbs and reduces the force (energy) which the webbing belt applies to the body of the vehicle occupant.

Specifically, the energy absorbing member, which is called a torsion shaft, is provided coaxially at the interior of the spool. The torsion shaft is integrally connected to the spool only at one axial direction end, and usually rotates integrally together with the spool.

The lock mechanism is connected integrally to the base lock at the other axial direction end side of the torsion shaft. The pinion of the pretensioner is provided coaxially with the torsion shaft, at the one axial direction end side of the torsion shaft. When the clutch mechanism is operated, the pinion and the torsion shaft are connected mechanically.

When the lock mechanism operates, the axial direction other end portion of the torsion shaft is locked, and rotation of the spool is restricted. In the state in which the lock mechanism is operated, when the vehicle occupant rotates the spool in the pull-out direction via the webbing belt, this torque is transmitted to the one axial direction end of the torsion shaft.

However, because the other axial direction end of the torsion shaft is locked by the lock mechanism, the one axial direction end of the torsion shaft rotates in the pull-out direction with respect to the other end. The torsion shaft thereby torsionally deforms. As described above, this torsional deformation of the torsion shaft absorbs and lessens the aforementioned energy.

At the time of this torsional deformation, the pinion also rotates in the pull-out direction. At the time when the vehicle rapidly decelerates, the pretensioner operates, and therefore, the pinion and the rack bar mesh together. Due to the sliding of the piston which accompanies the rise in internal pressure of the cylinder, the rack bar rotates the spool in the take-up direction. Therefore, when the pinion rotates in the pull-out direction as described above, the piston slides toward the floor portion against the internal pressure of the cylinder.

The internal pressure of the cylinder works to impede pull-out direction rotation of the one axial direction end of the torsion shaft via the rack bar and the pinion.

There is the problem that it is difficult to set the load needed to deform the torsion shaft, i.e., the so-called "force limiter load".

Various structures have been proposed in order to overcome this problem (see, for example, Japanese Patent Application Laid-Open (JP-A) Nos. 10-67300 and 2000-198413). In the structures disclosed in these publications, a gas vent hole or the like is formed in the piston or the cylinder.

In a structure in which a gas vent hole is formed in the piston, one end of the gas vent hole is open at the surface of the piston which surface is at the cylinder floor portion side. The other end of the gas vent hole is open at the side surface of the rack bar. Namely, in the state in which the rack bar is meshed with the pinion, when the pinion rotates in the pull-out direction and moves the rack bar toward the floor portion of the cylinder, accompanying the sliding of the piston, the gas remaining in the cylinder is made to pass from the gas vent hole toward the open end of the cylinder. In this way, the rise in the internal pressure of the cylinder accompanying the sliding of the piston toward the floor portion of the cylinder is prevented or lessened, and the effect on the force limiter load is reduced.

In a structure in which the gas vent hole is formed at the cylinder, the gas vent hole is formed further toward the floor portion side of the cylinder than the piston, and a valve is provided at the gas vent hole. When gas is supplied into the cylinder, the gas vent hole is closed by the valve. When the remaining gas is to be released when the piston is lowered, the valve is opened such that the gas vent hole is opened. In this way, the rise in the internal pressure of the cylinder accompanying the sliding of the piston toward the floor portion of the cylinder is prevented or lessened, and the effect on the force limiter load is reduced.

However, there are problems in that forming the gas vent hole in the piston and the rack bar, or forming the gas vent hole in the cylinder, is in and of itself difficult, and costs increase.

SUMMARY OF THE INVENTION

An object of the present invention is to provide a webbing retractor which, at a low cost, can easily stabilize the force limiter load.

In order to achieve the above object, in accordance with one aspect of the present invention, there is provided a webbing retractor used in a seat belt device of a vehicle, the webbing retractor comprising: a webbing; a spool to which one end of the webbing is fixed, and which can rotate in a webbing take-up direction and in a webbing pull-out direction which is opposite to the webbing take-up direction; a torsion shaft, one end of which is fixed to one axial direction end side of the spool; a pretensioner connected to another end of the torsion shaft; and a lock mechanism able to releasably lock the other end of the torsion shaft when the vehicle is in a predetermined state.

In the present webbing retractor, when the vehicle, which is traveling in a state in which the webbing belt is applied to a vehicle occupant, rapidly decelerates, the pretensioner operates. Torque is transmitted to the spool via the torsion shaft, and the spool is rotated forcibly by a predetermined amount in the take-up direction.

Due to the rotation of the spool in the take-up direction, the tension of the webbing belt increases, and the force by which the webbing belt restrains the body of the vehicle occupant increases. In this way, movement of the body of the vehicle occupant substantially toward the front of the vehicle, which movement accompanies the inertia at the time when the vehicle rapidly decelerates, can be prevented or mitigated.

The lock mechanism operates, and the other axial direction end portion of the torsion shaft is locked. Therefore, even if the body of the vehicle occupant attempts to move substantially toward the front of the vehicle due to the inertia at the time when the vehicle rapidly decelerates, and pulls the webbing belt and attempts to rotate the spool in the pull-out direction, the axial direction other end portion of the torsion shaft is substantially locked. Therefore, rotation of the axial direction one end of the torsion shaft in the pull-out direction is restricted, and accordingly, rotation, in the pull-out direction, of the spool which is connected integrally to the axial direction one end of the torsion shaft is restricted.

Due to the rotation of the spool being restricted, pulling-out of the webbing belt is restricted. As a result, the webbing belt reliably restrains and holds the body of the vehicle occupant.

In the state in which the lock mechanism is operated, in a case in which the body of the vehicle occupant pulls the webbing belt by a force of a predetermined magnitude or more due to the inertia at the time when the vehicle rapidly decelerates, and pulls the webbing belt and attempts to rotate the spool in the pull-out direction, torque of a predetermined magnitude or more in the pull-out direction acts on the one axial direction end of the torsion shaft. As described above, in the state in which the lock mechanism is operated, the torsion shaft is locked, and rotation in the pull-out direction is restricted at the axial direction other end portion of the torsion shaft.

Accordingly, relative rotation arises between the one axial direction end and the other axial direction end of the torsion shaft, and the torsion shaft deforms (is twisted). Due to this deformation, the restraining force (load) which the webbing belt applies to the body of the vehicle occupant is lessened.

The pretensioner is connected to the other axial direction end of the torsion shaft which is locked when the lock mechanism operates. The lock mechanism locks the axial direction other end of the torsion shaft at appropriate times. Therefore, the torque of the torsion shaft in the pull-out direction is not transmitted to the pretensioner.

Therefore, even if the torque in the pull-out direction is transmitted to the one axial direction end of the torsion shaft, the structural element of the pretensioner (i.e., the pinion) is not rotated in the pull-out direction. In this way, the pretensioner does not impede the deformation of the torsion shaft. Accordingly, the torque in the pull-out direction which is needed to deform the torsion shaft, i.e., the so-called "force limiter load", can be set easily and accurately.

Other objects, features and advantages of the present invention will be apparent to those skilled in the art from the explanation of the preferred embodiment of the present invention illustrated in the appended drawings, and from the appended claims.

DETAILED DESCRIPTION OF THE INVENTION

Figure 1:
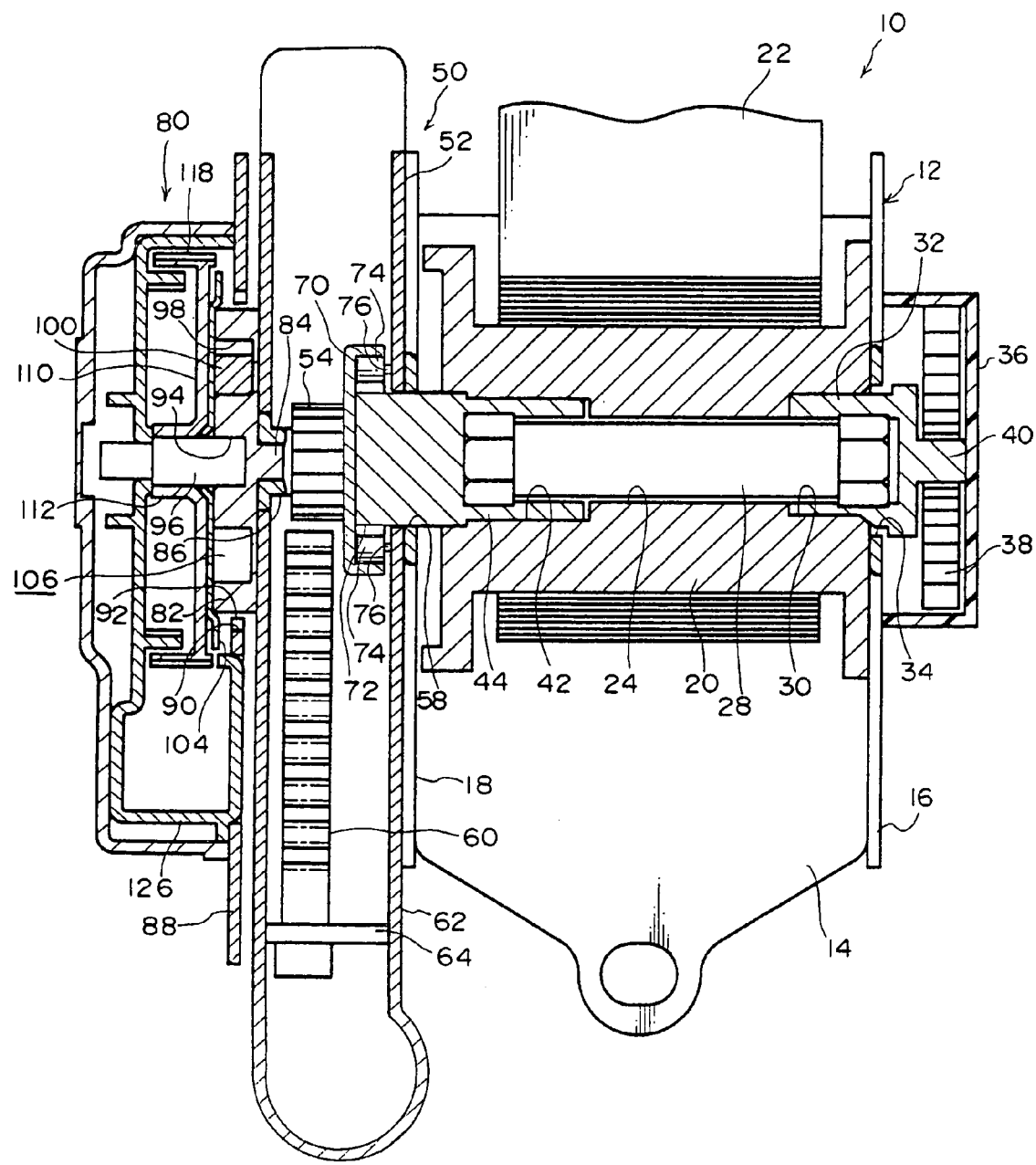
FIG. 1 is a longitudinal sectional view of a webbing retractor of an embodiment of the present invention.

A webbing retractor of an embodiment of the present invention will be described hereinafter. Referring to FIG. 1, a webbing retractor 10 has a frame 12. The frame 12 has a flat-plate-shaped base portion 14. The webbing retractor 10 is mounted to a vehicle body by the base portion 14 being fixed to a predetermined position of the vehicle body by a fixing means such as bolts or the like.

A leg plate 16 extends from one transverse direction end of the base portion 14. A leg plate 18 extends, in the same direction as the leg plate 16 and parallel to the leg plate 16, from the other transverse direction end of the base portion 14. A spool 20 is disposed between the leg plate 16 and the leg plate 18.

The spool 20 has an axis of rotation which passes through the leg plates 16, 18 substantially orthogonally thereto, and has a substantially hollow cylindrical shape which is concentric to this axis. The longitudinal direction proximal end portion of an elongated, belt-shaped webbing belt 22 is anchored at the spool 20. Due to the spool 20 rotating in one direction (the take-up direction) around the axis of rotation thereof, the webbing belt 22 is taken-up onto the outer peripheral portion of the spool 20 from the proximal end side of the webbing belt 22. In this state in which the webbing belt 22 is taken-up, due to the webbing belt 22 being pulled toward the distal end side thereof, the webbing bell 22 is pulled out from the spool 20.

Three holes which are coaxial and communicate with one another, i.e., a shaft insert-through hole 24, and a sleeve insert-through hole 30 and a sleeve insert-through hole 42 at the both sides of the shaft insert-through hole 24, are formed in the spool 20. A torsion shaft (energy absorbing member) 28, which is formed substantially in the shape of a solid cylinder, is accommodated within the shaft insert-through hole 24 so as to be rotatable and coaxial with respect to the spool 20. The leg plate 16 side end portion of the shaft insert-through hole 24 opens at the inner floor portion of the sleeve insert-through hole 30. The inner diameter of the sleeve insert-through hole 30 is sufficiently larger than the shaft insert-through hole 24, and the sleeve insert-through hole 30 opens to the exterior at the leg plate 16 side of the spool 20.

The axial direction leg plate 16 side of the torsion shaft 28 which is accommodated in the shaft insert-through hole 24 is disposed in the sleeve insert-through hole 30. The axial direction leg plate 16 side end portion of the torsion shaft 28 is connected integrally to a sleeve 32. The sleeve 32 is connected to the spool 20 integrally and mechanically, in a state in which the sleeve 32 is inserted through the sleeve insert-through hole 30. Accordingly, the torsion shaft 28 is connected integrally and mechanically to the spool 20 at the axial direction leg plate 16 side of the torsion shaft 28.

The sleeve 32, which is connected to the spool 20 and the torsion shaft 28, passes through a circular hole 34 formed in the leg plate 16, and projects out to the exterior of the leg plate 16. A spring case 36 is fixed to the outer side of the leg plate 16. The spring case 36 is formed, on the whole, substantially in the shape of a box, and a spiral spring 38 is accommodated at the interior thereof.

The end portion of the spiral spring 38 at the inner side in the direction of winding thereof, is integrally fixed to an anchor portion 40 which extends coaxially from the main body portion of the sleeve 32. The end portion of the spiral spring 38 at the outer side in the direction of winding thereof, is fixed integrally to the spring case 36. The spiral spring 38 urges the sleeve 32 in one direction around the axis thereof (i.e., in the take-up direction). The urging force of the spiral spring 38 is transmitted to the spool 20 via the sleeve 32. The webbing belt 22 is taken-up onto the spool 20 due to this urging force.

The leg plate 18 side end portion of the shaft insert-through hole 24 opens at the inner floor portion of the sleeve insert-through hole 42 which is formed coaxially with the spool 20. The inner diameter of the sleeve insert-through hole 42 is sufficiently larger than the shaft insert-through hole 24. The leg plate 18 side end portion of the sleeve insert-through hole 42 opens at the leg plate 18 side end portion of the spool 20.

The axial direction leg plate 18 side of the torsion shaft 28, which is accommodated in the shaft insert-through hole 24, is disposed within the sleeve insert-through hole 42. The axial direction leg plate 18 side end portion of the torsion shaft 28, is integrally connected to a sleeve 44 which is inserted through the sleeve insert-through hole 42. Differently from the sleeve 32, the sleeve 44 is connected to the spool 20 in a state of being inserted through the sleeve insert-through hole 42, but the sleeve 44 can rotate coaxially to and relative to the spool 20.

A pretensioner 50 is provided at the outer side of the leg plate 18.

Figure 2:
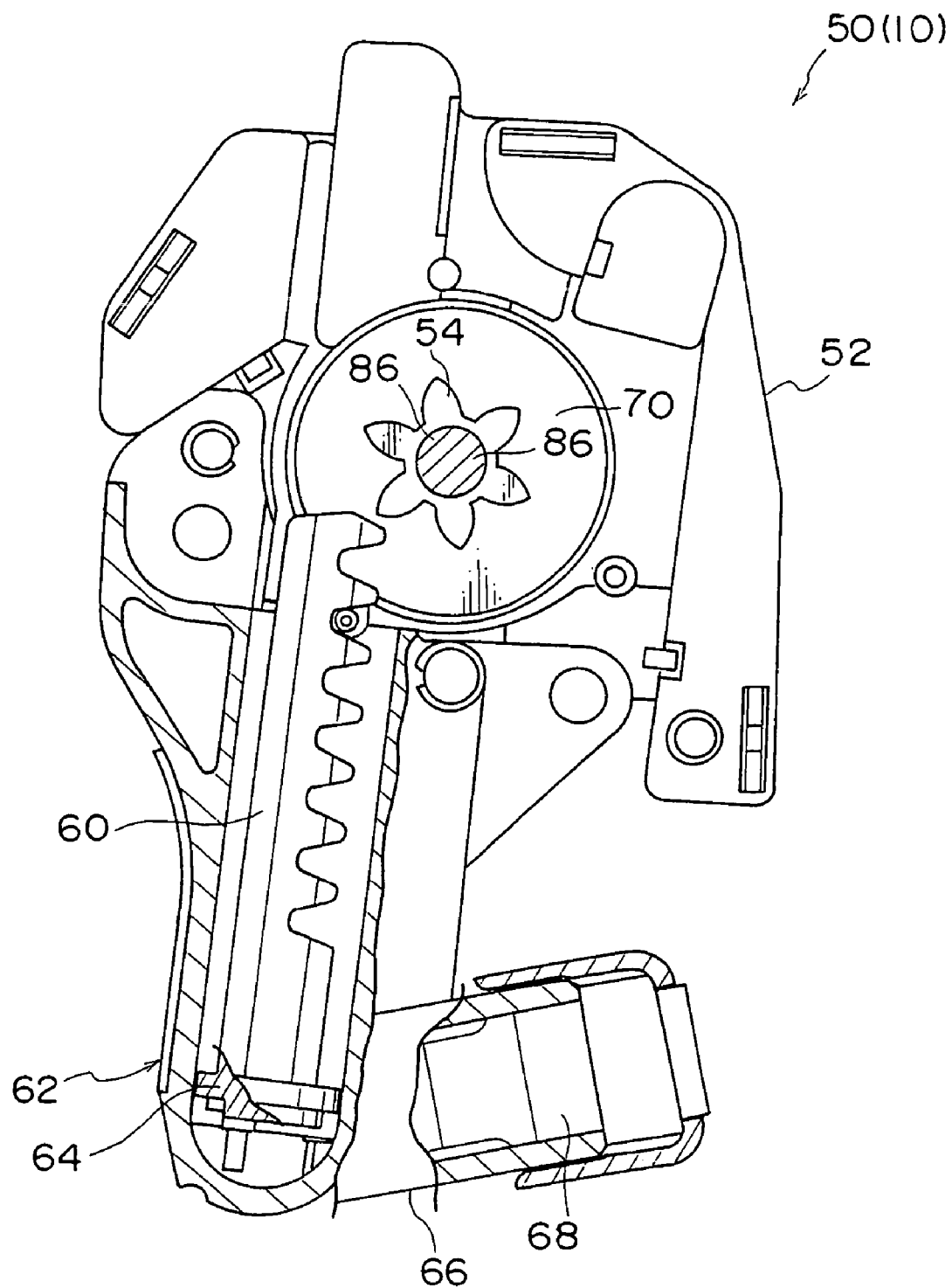
FIG. 2 is a side sectional view of a pretensioner of the webbing retractor.

As shown in FIGS. 1 and 2, the pretensioner 50 has a housing 52. The housing 52 is formed of a metal or a hard synthetic resin material, and is fixed to the leg plate 18.

A pinion (rotating member) 54 is accommodated in the housing 52. The axis of rotation of the pinion 54 extends substantially orthogonally to the leg plates 16, 18. A press-contact portion 70, whose diameter is larger than that of the pinion 54, is provided at the axial direction leg plate 18 side of the pinion 54.

Figure 3A:
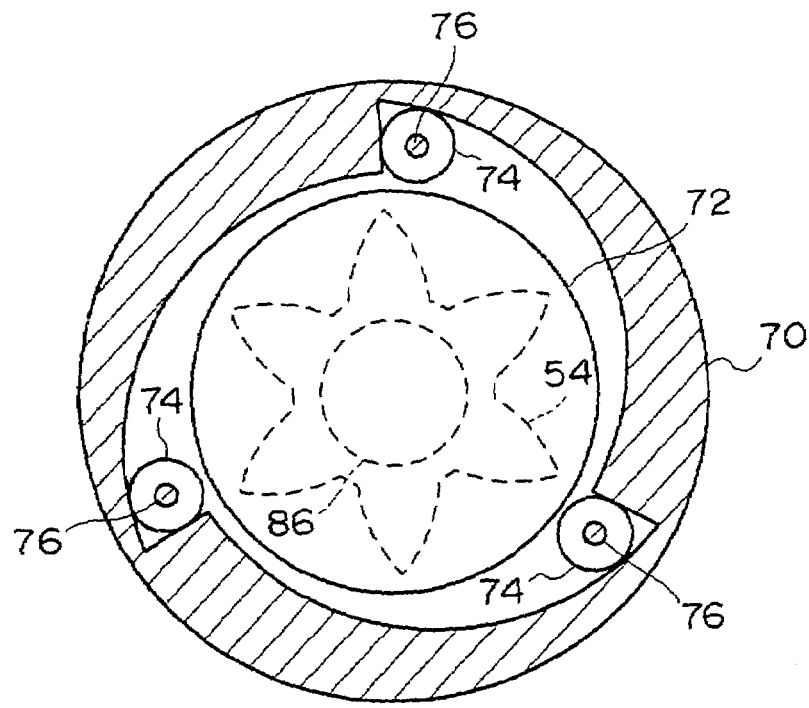
FIG. 3A is a side sectional view showing a usual state of a connecting mechanism (a clutch mechanism) which connects a press-contact portion and a rotating portion of the pretensioner.

The press-contact portion 70 is formed in the shape of a shallow dish (or the shape of a tube which has a floor and whose axial direction dimension is short) whose external configuration is a circle coaxial to the pinion 54 and whose axial direction leg plate 18 side is open. As shown in FIG. 3A, the configuration of the inner periphery of the press-contact portion 70 is such that curved surfaces, which gradually approach the axially central portion of the press-contact portion 70 along the pull-out direction (the direction opposite to the direction of arrow A in FIG. 3B), are formed substantially at every 120° around the central axis of the press-contact portion 70.

A rotating portion 72 is provided coaxially to the press-contact portion 70 at the inner side of the press-contact portion 70. The rotating portion 72 is substantially disc-shaped, and is formed coaxially and integrally with the sleeve 44 which passes through a circular hole 58 formed in the leg plate 18 and which projects into the housing 52.

Further, a shaft 86 is formed coaxially and integrally from the side of the rotating portion 72 (which is integral with the sleeve 44), which side is opposite the sleeve 44. The press-contact portion 70 and the pinion 54 are supported so as to be freely rotatable due to the shaft 86 coaxially passing through the press-contact portion 70 and the pinion 54.

Moreover, as shown in FIG. 3A, three press-contact rollers 74 are disposed substantially at every 120°, between the outer peripheral portion of the rotating portion 72 and the inner peripheral portion of the press-contact portion 70. The outer diameter of the press-contact roller 74 is sufficiently smaller than the difference between the maximum value of the inner diameter of the press-contact portion 70 and the outer diameter of the rotating portion 72. Further, the outer diameter of the press-contact roller 74 is sufficiently larger than the difference between the minimum value of the inner diameter of the press-contact portion 70 and the outer diameter of the rotating portion 72.

The press-contact rollers 74 are respectively pivotally supported at pivot shafts 76 which project out from the housing 52. The press-contact rollers 74 are usually positioned at the portions where the inner diameter of the press-contact portion 70 is the maximum. The outer peripheral portions of the press-contact rollers 74 are set apart from the outer peripheral portion of the rotating portion 72, such that the press-contact rollers 74 do not interfere with the rotating portion 72.

Figure 3B:
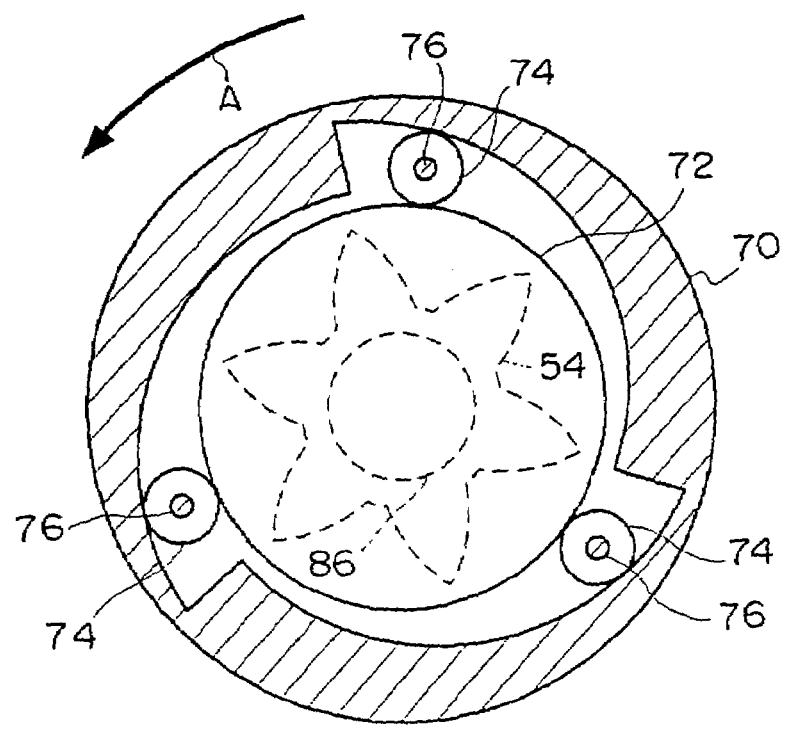
FIG. 3B is a side sectional view showing a connecting state of this mechanism.

However, when, due to the press-contact portion 70 rotating in the take-up direction (the direction of arrow A in FIG. 3B), the inner peripheral portion of the press-contact portion 70, whose inner diameter gradually becomes smaller, presses the press-contact rollers 74 toward the axial center of the press-contact portion 70 such that the pivot shafts 76 break, the press-contact rollers 74 are displaced toward the axial center of the press-contact portion 70 due to the pushing force from the press-contact portion 70. As shown in FIG. 3B, due to the aforementioned displacement of the press-contact rollers 74, the inner peripheral portion of the press-contact portion 70 press-contacts the press-contact rollers 74 in a state in which the press-contact rollers 74 press-contact the outer peripheral portion of the rotating portion 72.

Therefore, the press-contact portion 70 and the rotating portion 72 are mechanically connected via the press-contact rollers 74, the torque of the press-contact portion 70 in the take-up direction is transmitted to the rotating portion 72, and the rotating portion 72 rotates in the take-up direction. As described above, because the rotating portion 72 is connected coaxially and integrally to the sleeve 44, the torque in the take-up direction which is applied to the rotating portion 72 is transmitted to the spool 20 via the sleeve 44, the torsion shaft 28, and the sleeve 32.

A square-rod-shaped rack bar 60 is disposed at the side of the pinion 54. The longitudinal direction of the rack bar 60 runs along the height wise direction of the frame 12. Rack teeth, which can mesh with the pinion 54, are formed at one longitudinal direction end side of the rack bar 60.

The rack teeth of the rack bar 60 are structured so as to be able to mesh with the pinion 54 when the rack bar 60 slides upward, and usually do not mesh with the pinion 54.

The pretensioner 50 has a cylinder 62. The cylinder 62 is formed in the shape of a tube having a floor, whose top end is open. A piston 64 is accommodated within the cylinder 62 so as to be freely slidable in the vertical direction. The rack bar 60 is connected integrally to the upper side end portion of the piston 64. The rack bar 60 slides up and down due to the piston 64 sliding up and down in the cylinder 62.

A generator accommodating portion 66 is provided in a vicinity of the floor portion of the cylinder 62. The generator accommodating portion 66 is formed substantially in the shape of a tube whose axial direction is tilted with respect to the axial direction of the cylinder 62. One axial direction end portion of the generator accommodating portion 66 is connected integrally to the cylinder 62 in a vicinity of the floor portion of the cylinder 62, and communicates with the interior of the cylinder 62 in a vicinity of the floor portion of the cylinder 62.

A gas generator 68 is accommodated in the generator accommodating portion 66. The gas generator 68 is formed on the whole in the shape of a solid cylinder whose outer diameter is extremely slightly smaller than the inner diameter of the generator accommodating portion 66. A gas generating agent (not illustrated) which instantaneously generates a predetermined amount of gas by being burned, an ignition device (also not illustrated) which ignites the gas generating agent, and the like are accommodated within the gas generator 68.

The ignition device is connected directly to an acceleration sensor which is provided separately, or is connected indirectly to the acceleration sensor via a control device such as a computer or the like. (Neither the acceleration sensor nor the control device is illustrated.) When the ignition device operates due to the acceleration sensor detecting a state of rapid deceleration of the vehicle, the gas generating agent is burned, gas is generated instantaneously, and the gas is supplied to the interior of the cylinder 62 from one axial direction end portion of the gas generator 68 (the end portion at the cylinder 62 side).

A lock mechanism 80 is provided at the side of the pretensioner 50 opposite the side at which the frame 12 is located.

Figure 4:
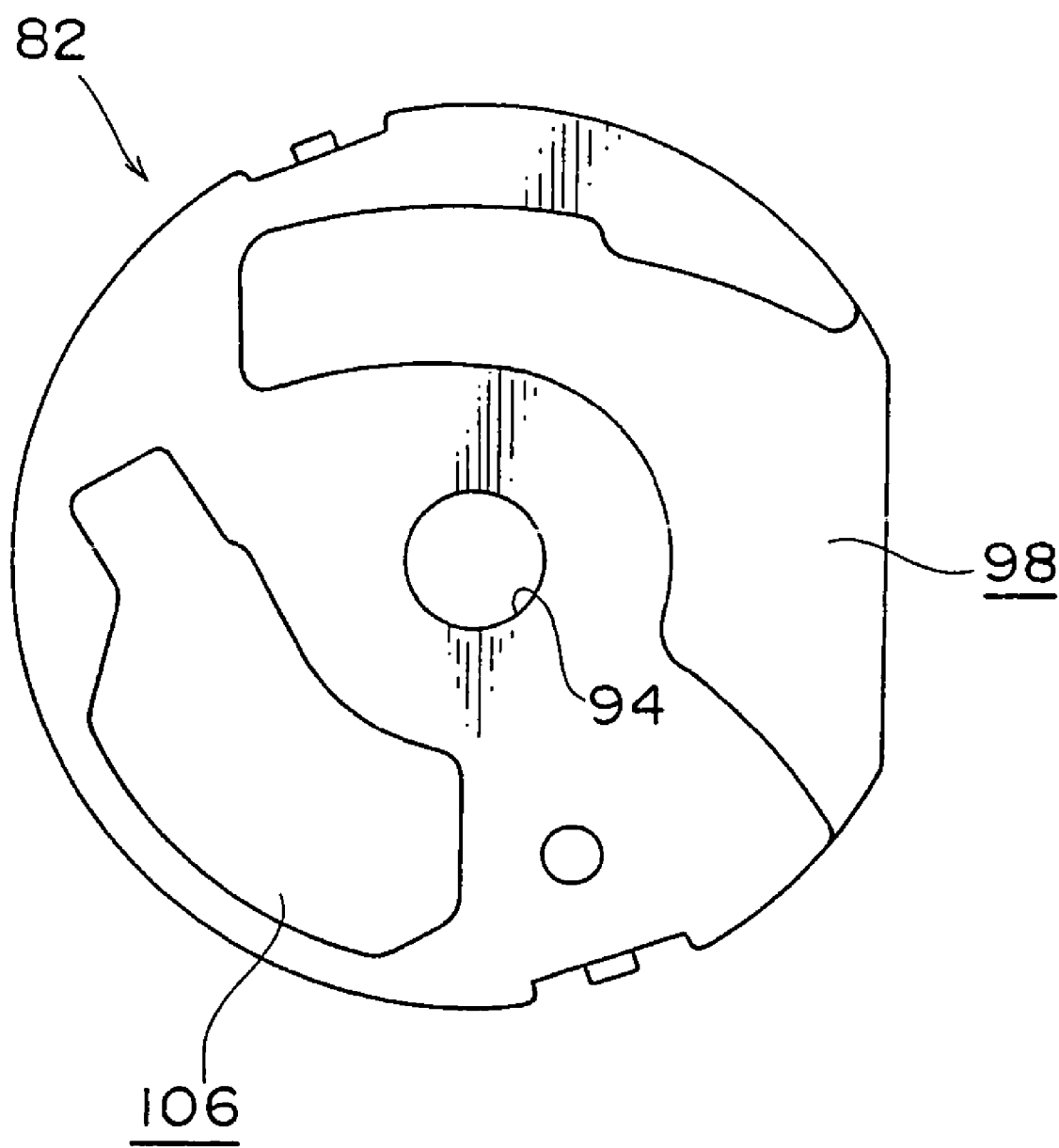
FIG. 4 is a plan view of a base lock structuring a lock mechanism.

The lock mechanism 80 has a base lock 82. As shown in FIGS. 1 and 4, the base lock 82 is formed in the shape of a hollow cylinder having a flange, whose axial direction runs along the direction in which the leg plates 16, 18 oppose one another. A shaft 84 is connected integrally and coaxially to the leg plate 18 side end portion of the base lock 82.

The shaft 84 passes through the housing 52 of the pretensioner 50, and enters into the interior of the housing 52. The shaft 86 extends integrally and coaxially with the pinion 54 and a shaft 56, in correspondence with the shaft 84 and from the side of the pinion 54 opposite the side at which the shaft 56 is located. The shaft 84 is coaxially fit together with the shaft 86 so as to be integrally connected to the shaft 86.

As shown in FIG. 1, a lock wall 88 is disposed at the radial direction outer side of the base lock 82. The lock wall 88 is formed integrally with the frame 12. A ratchet hole 90 is formed in a portion of the lock wall 88. Internal ratchet teeth 92 are formed at the inner peripheral portion of the ratchet hole 90. The base lock 82 passes coaxially through the ratchet hole 90.

A small hole 94 is formed in the surface of the base lock 82 at the side opposite the side where the shaft 84 is formed. A shaft 96 fits together integrally with this small hole 94. Moreover, an accommodating portion 98, which is shaped as a recess and which opens toward the side opposite the side where the shaft 84 is formed, is formed in the surface of the base lock 82 at the side opposite the side where the shaft 84 is formed (see FIGS. 4, 6 and 7).

Figure 5:
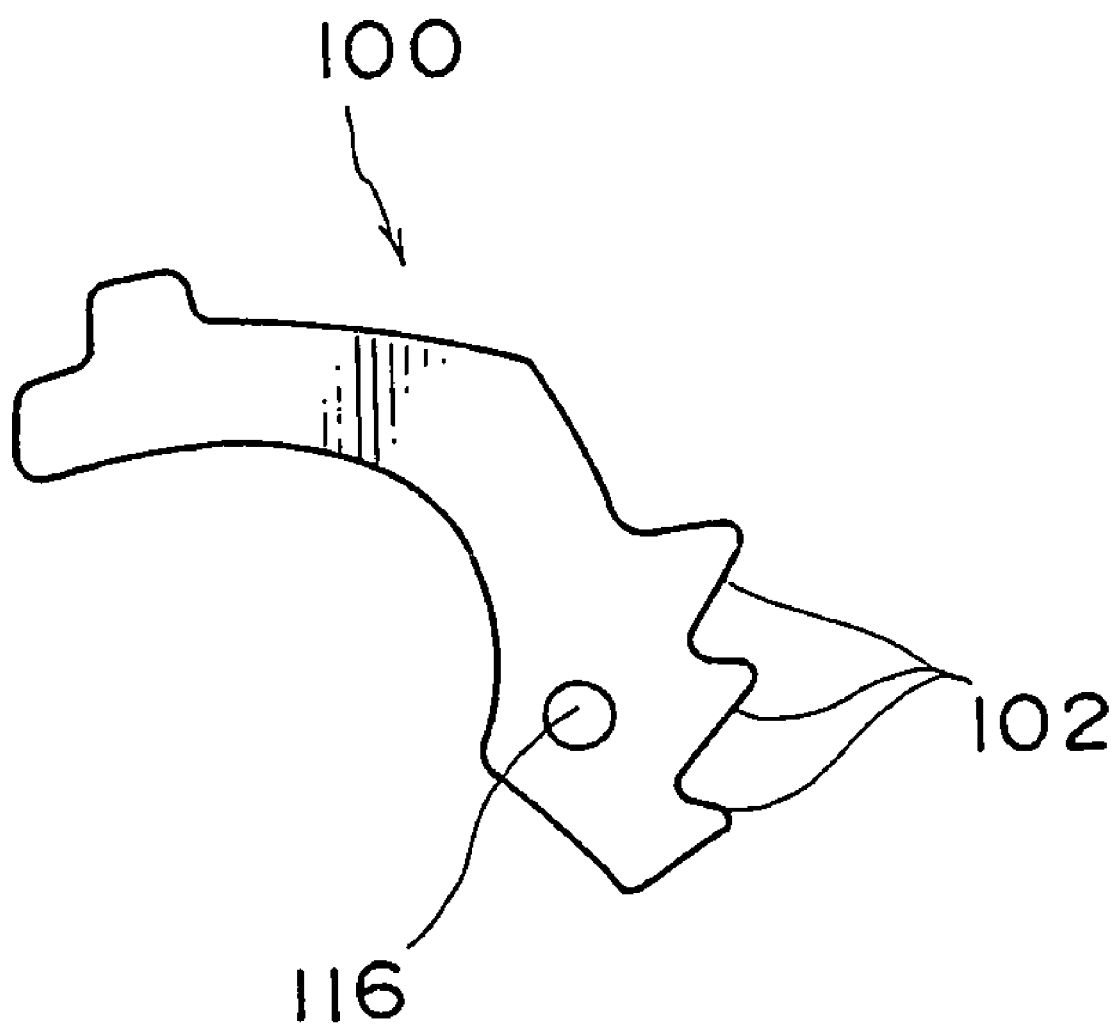
FIG. 5 is a plan view of a lock plate structuring the lock mechanism.
Figure 7:
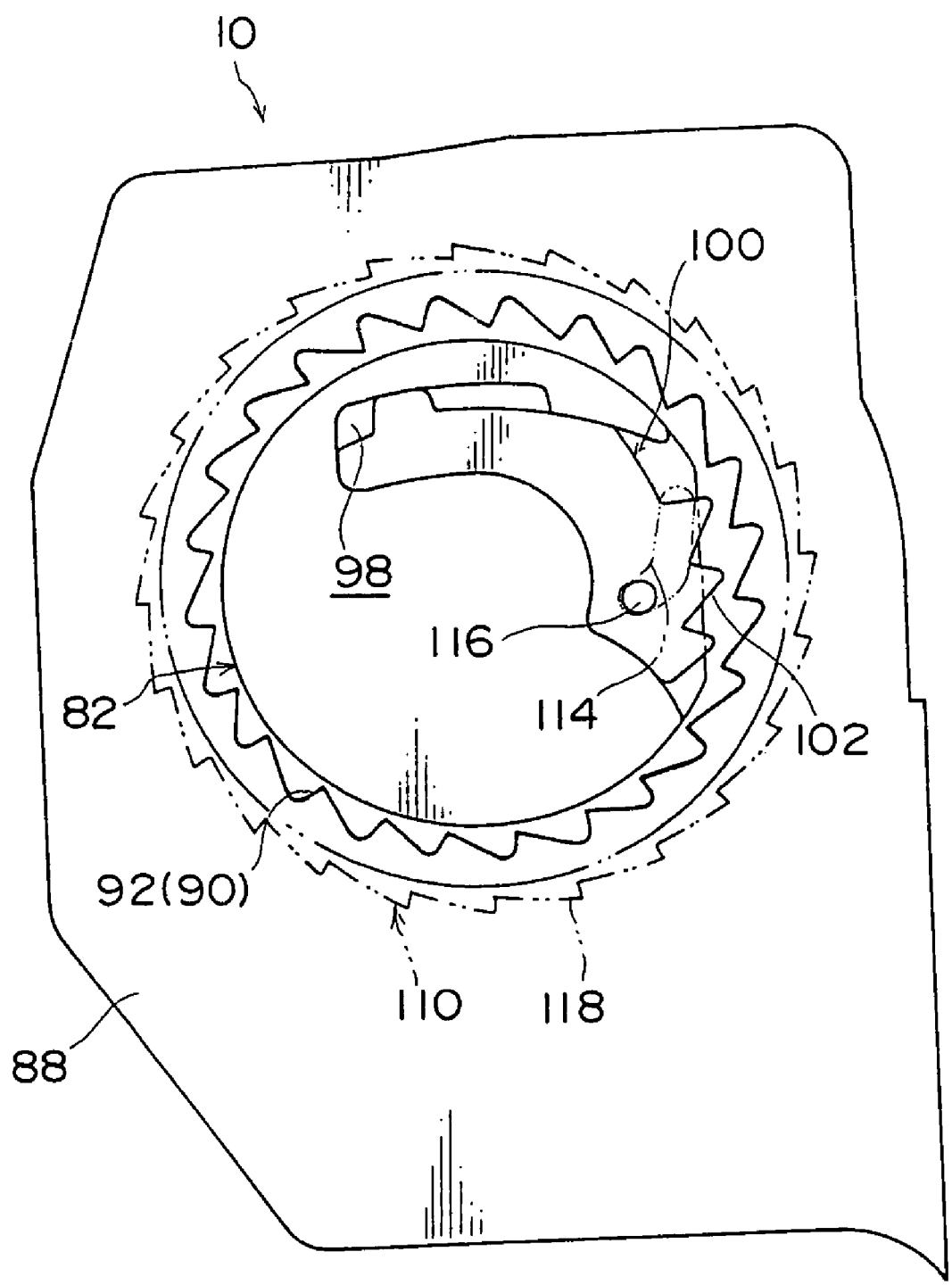
FIG. 7 is a side view showing an unlocking state of the lock mechanism.
Figure 8:
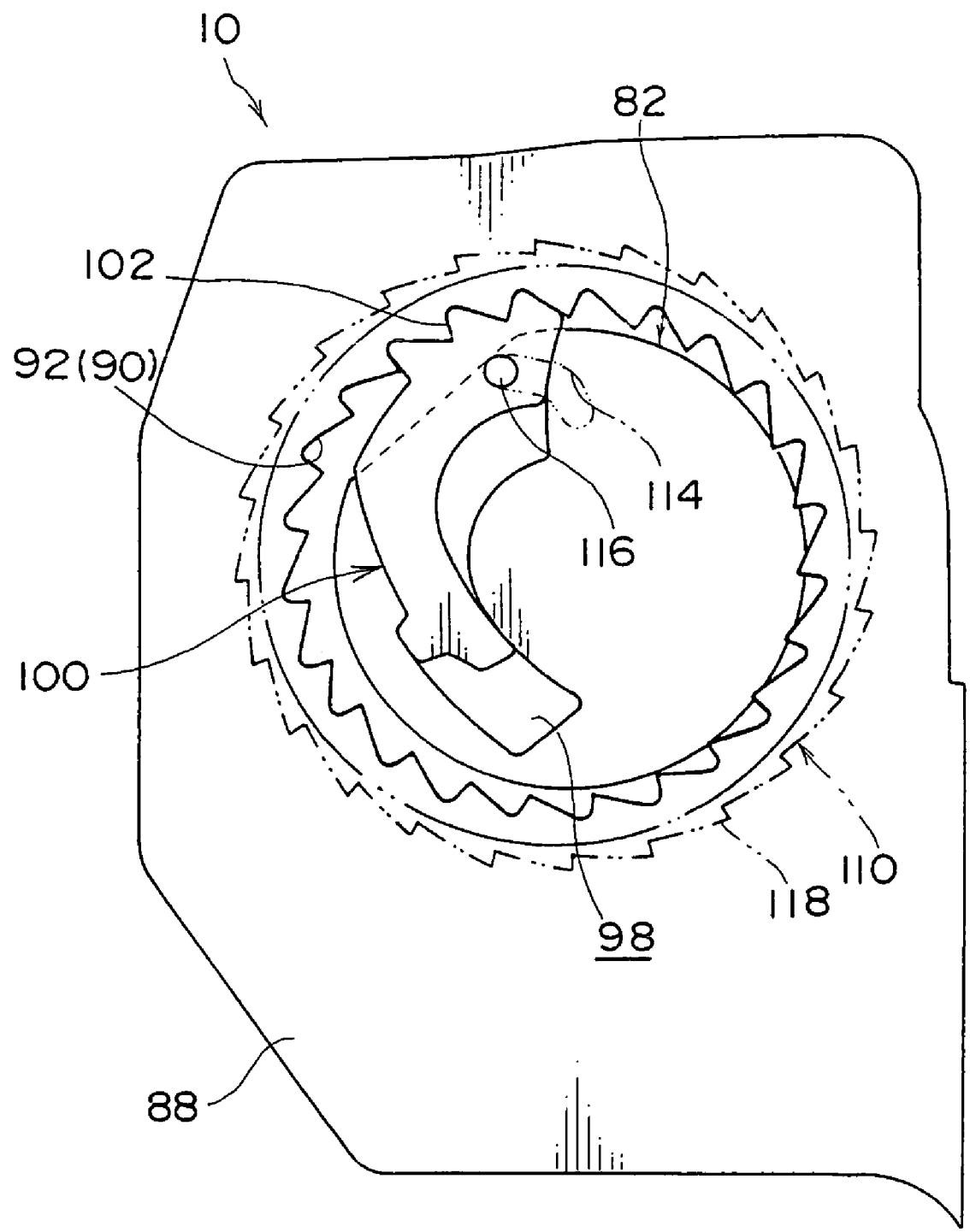
FIG. 8 is a side view showing a locking state of the lock mechanism.

The accommodating portion 98 is formed on the whole substantially in the shape of an arc-shaped plate. A lock plate 100 having lock teeth 102 is accommodated at the inner side of the accommodating portion 98 (see FIGS. 5, 7 and 8). As shown in FIG. 1, a lock cover 104, which is shaped as a thin disc and which is for preventing the lock plate 100 from falling off, is mounted in a state in which rotation thereof is prevented, to the surface of the base lock 82 at the side opposite the side where the shaft 84 is formed.

A spring accommodating portion 106 is formed at the base lock 82 (see FIG. 4). The spring accommodating portion 106 is formed at the side of the center of the base lock 82 approximately opposite the side where the accommodating portion 98 is formed. A compression coil spring 108 (see FIG. 6) is accommodated at the inner side of the spring accommodating portion 106.

A V gear 110 is disposed at the side of the lock plate 100 opposite the side at which the base lock 82 is located (see FIG. 1). A tubular boss 112 is formed at the axially central portion of the V gear 110, and is pivotally supported so as to be able to follow the rotation of the shaft 96 (see FIG. 6). A V-shaped guide hole 114 is formed in the V gear 110. A guide pin 116, which stands erect from the lock plate 100, is inserted in the guide hole 114. Lock teeth 118 are formed integrally at the outer peripheral portion of the V gear 110.

Figure 6:
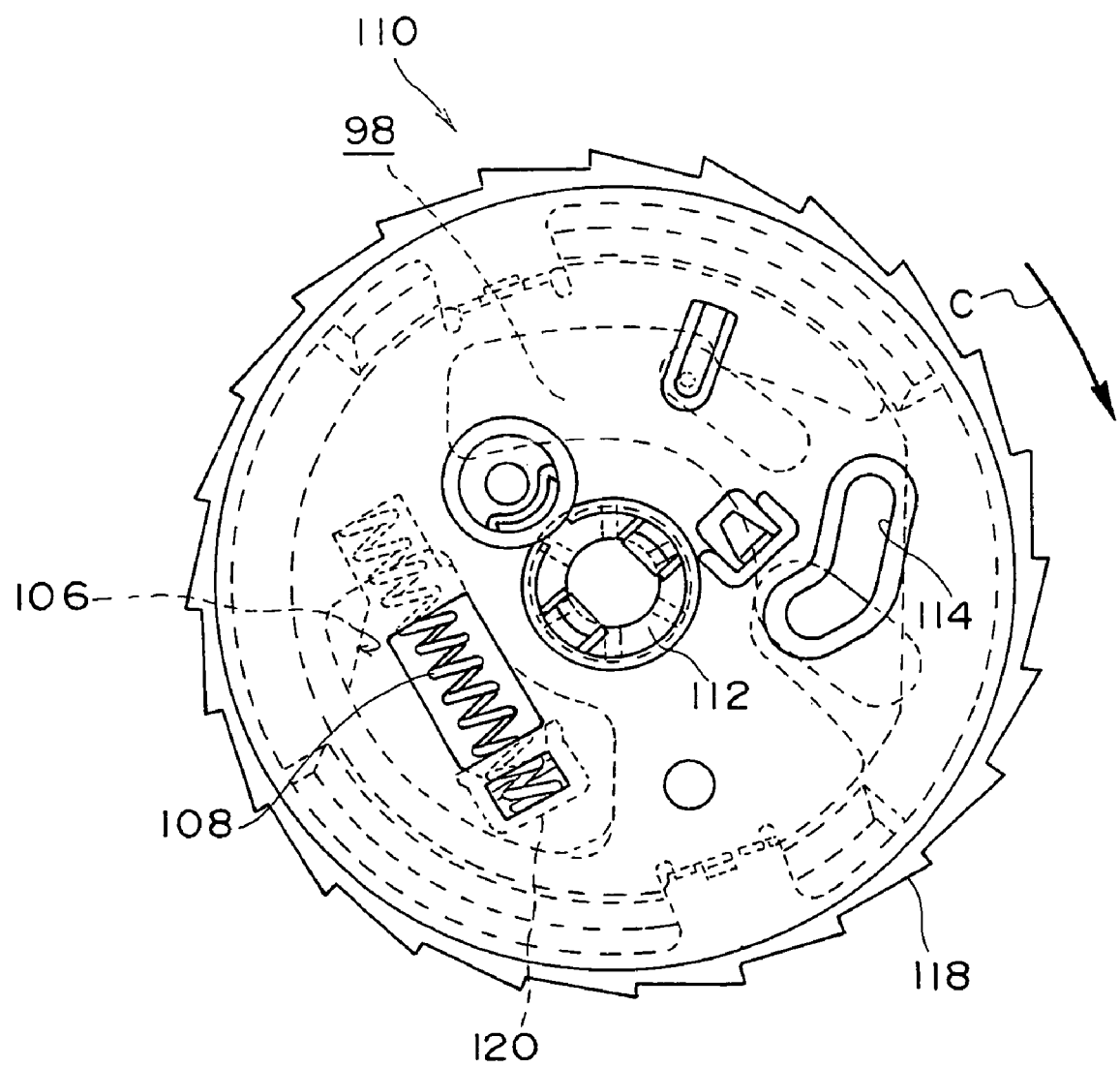
FIG. 6 is a plan view of a V gear structuring the lock mechanism.

Further, as shown in FIG. 6, a wall portion 120 is formed the end surface of the V gear 110 which end surface is at the side opposing the base lock 82 when the V gear 110 is in an assembled state. The wall portion 120 is disposed within the spring accommodating portion 106. The pull-out direction side end portion of the compression coil spring 108 abuts the wall portion 120.

A known acceleration sensor 122 for a VSIR (see FIG. 9), which serves as a structural part of the lock mechanism 80 and which structures the locking means, is disposed at the lower side of the V gear 110. Illustration of the acceleration sensor 122 is omitted from FIG. 1. When the vehicle rapidly decelerates, a ball 124 of the acceleration sensor 122 rolls on a sensor housing 126 and swings a sensor lever 128. A lock claw 130 of the sensor lever 128 thereby engages with the lock tooth 118 of the V gear 110.

Figure 9:
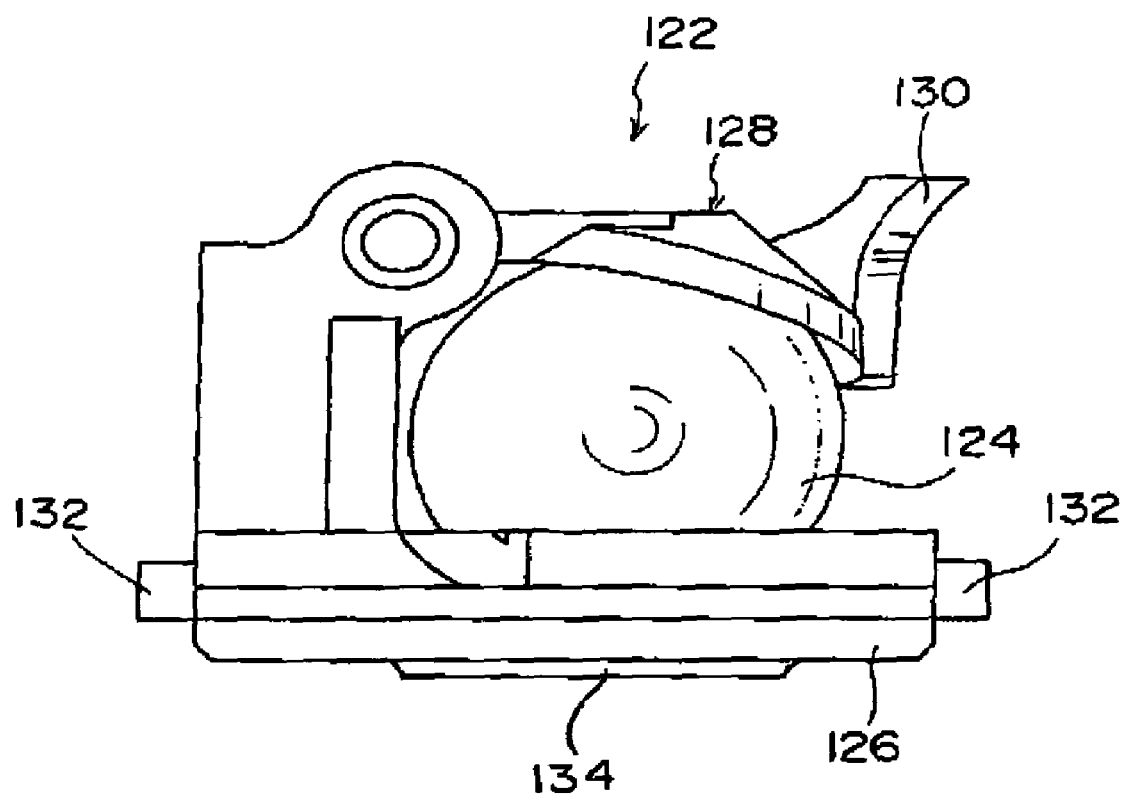
FIG. 9 is a side view of an acceleration sensor structuring the lock mechanism.

The acceleration sensor 122 is held by a sensor holder 132 made of resin (see FIG. 9). A sensor cover 134, which is made of resin and whose configuration is similar to that of the sensor holder 132, is disposed at the outer side of the sensor holder 132. The sensor holder 132 and the sensor cover 134 are formed integrally, and are fixed to the lock wall 88 of the frame 12.

Note that internal teeth, which can engage with a pawl for an unillustrated WSIR which is pivotally supported at the V gear 110, are formed integrally at the inner peripheral portion of the sensor holder 132.

Next, the operation and effects of the present embodiment will be described.

A vehicle occupant grasps the unillustrated tongue plate through which the webbing belt 22 is inserted, pulls the webbing belt 22 out from the spool 20 against the urging force of the spiral spring 38, and engages the tongue plate with an unillustrated buckle device. The vehicle occupant is thereby set in a state in which the webbing of a three-point seat belt device is applied to him/her. Namely, the portion of the webbing belt 22 from an unillustrated shoulder anchor, which is disposed at the upper portion of the center pillar, to the tongue plate is the shoulder side webbing belt 22. The portion of the webbing belt 22 from the tongue plate to the webbing retractor is the lap side webbing belt 22.

At the above-described usual time of pulling out the webbing belt 22, when the spool 20 is rotated in the pull-out direction due to the vehicle occupant pulling the webbing belt 22, the rotation of the spool 20 rotates the base lock 82 in the pull-out direction, via the sleeve 32, the torsion shaft 28, the sleeve 44, the rotating portion 72, the shaft 86 and the shaft 84. Due to the base lock 82 rotating in the pull-out direction, a portion of the inner peripheral wall of the spring accommodating portion 106 formed at the base lock 82 attempts to press and compress the axial direction other end portion of the compression coil spring 108. Due to its own elastic force, the compression coil spring 108, which has received this pressing force, pushes the wall portion 120, which the one axial direction end portion of the compression coil spring 108 is abutting, and rotates the V gear 110 in the pull-out direction. Therefore, in the usual pulling-out, the V gear 110 rotates following the rotation of the spool 20.

In the state in which the webbing belt 22 is applied to the vehicle occupant, when the vehicle rapidly decelerates, the pretensioner 50 operates.

When the acceleration sensor of the pretensioner 50 senses that the vehicle has rapidly decelerated, a signal is sent from the acceleration sensor to the ignition device of the gas generator 68, either directly or indirectly via the control means. The ignition device, which has received the signal from the acceleration sensor, burns the gas generating agent of the gas generator 68, such that gas is generated instantaneously.

The gas which is generated within the gas generator 68 is supplied from the generator accommodating portion 66 to the interior of the cylinder 62. When the gas is supplied into the cylinder 62, the internal pressure within the cylinder 62 rises, and the piston 64 is pushed out toward the upper open end side of the cylinder 62 due to this increase in internal pressure. When the piston 64 moves, the rack bar 60 (which is integral with the piston 64) meshes with the pinion 54, and rotates the pinion 54 in the take-up direction.

When the press-contact portion 70 rotates in the take-up direction due to the rotation of the pinion 54 in the take-up direction, the inner peripheral portion of the press-contact portion 70 presses the press-contact rollers 74, breaks the pivot shafts 76, causes the press-contact rollers 74 to press-contact the outer peripheral portion of the rotating portion 72, and rotates the rotating portion 72 in the take-up direction (see FIG. 3B). The torque in the take-up direction, which is applied to the rotating portion 72, is transmitted to the spool 20 via the sleeve 44, the torsion shaft 28, and the sleeve 32. Therefore, when the rotating portion 72 is suddenly and forcibly rotated in the take-up direction in this way, the spool 20 rotates suddenly in the take-up direction and takes-up the webbing belt 22. In this way, the force by which the webbing belt 22 restrains the body of the vehicle occupant increases, and restrains the body of the vehicle occupant more strongly than it had until then.

Simultaneously therewith, the state of rapid deceleration of the vehicle is detected by the acceleration sensor 122. Namely, the ball 124 of the acceleration sensor 122 rolls on the sensor housing 126, and swings the sensor lever 128. In this way, the lock claw 130 of the sensor lever 128 engages with the lock tooth 118 of the V gear 110, such that rotation of the V gear 110 in the pull-out direction is impeded.

The body of the vehicle occupant, which attempts to move toward the front of the vehicle due to the inertia at the time of the rapid deceleration, pulls the webbing belt 22 which is applied thereto. Therefore, the spool 20 attempts to rotate in the pull-out direction due to the tension of the webbing belt 22 received from the vehicle occupant. Thus, relative rotation against the urging force of the compression coil spring 108 arises between the spool 20, which is attempting to rotate in the pull-out direction, and the V gear 110, at which rotation in the pull-out direction is impeded.

When relative rotation arises between the spool 20 and the V gear 110, the guide pin 116 of the lock plate 100, which is held in the accommodating portion 98 of the base lock 82, is guided by the guide hole 114 of the V gear 110 and is moved substantially toward the radial direction outer side of the base lock 82. In this way, the lock teeth 102 of the lock plate 100 mesh with the ratchet teeth 92 of the ratchet hole 90 which is formed in the lock wall 88.

Rotation of the base lock 82 in the pull-out direction is restricted, and accordingly, rotation, in the pull-out direction, of the shafts 96, 86, the shaft 56, the rotating portion 72, the sleeve 44, the torsion shaft 28, and the sleeve 32, is restricted. When rotation of the sleeve 32 in the pull-out direction is restricted, rotation of the spool 20 in the pull-out direction is restricted, and accordingly, pulling-out of the webbing belt 22 is restricted.

In this way, due to the pulling-out of the webbing belt 22 being restricted, the webbing belt 22 more reliably holds the body of the vehicle occupant which is attempting to move toward the front of the vehicle due to inertia at the time when the vehicle rapidly decelerates, and restricts movement of the body of the vehicle occupant.

In the above-described state in which rotation of the base lock 82 in the pull-out direction is restricted, when the body of the vehicle occupant, which is attempting to move toward the front of the vehicle, attempts to pull the webbing belt 22 out by a force of a predetermined magnitude or more, this torque in the pull-out direction is transmitted to one end of the torsion shaft 28 (the end portion at the leg plate 16 side) via the sleeve 32. At this time, rotation, in the pull-out direction, of the other end of the torsion shaft 28 (the end portion at the leg plate 18 side) is restricted due to the rotation of the base lock 82 being restricted.

Accordingly, the torsion shaft 28 is torsionally deformed (plastically deformed) around the axial center thereof. Excess torque in the pull-out direction is absorbed by this torsional deformation. Namely, the pressure which the webbing belt 22 applies to the body of the vehicle occupant can be decreased.

In the present webbing retractor 10, the sleeve 44, which can rotate relative to the spool 20, is connected indirectly and integrally to the base lock 82 of the lock mechanism 80. Therefore, due to the operation of the pretensioner 50, in the state in which the rotating portion 72 and the press-contact portion 70 (i.e., the pinion 54) are mechanically connected via the press-contact rollers 74, the lock mechanism 80 operates, and the rotation of the pinion 54 also is set in a state of being indirectly restricted due to the rotation of the base lock 82 being restricted.

In this state in which rotation of the base lock 82 is restricted, even if rotation of the spool 20 in the pull-out direction is transmitted to the torsion shaft 28 via the sleeve 32, the press-contact portion 70 and the pinion 54 cannot rotate in the pull-out direction. Accordingly, the rack bar 60 is not lowered.

In this way, at the time when the torsion shaft 28 torsionally deforms, the rack bar 60 is not lowered. Accordingly, the piston 64 is not lowered. Therefore, the internal pressure of the cylinder 62 does not affect the torsional deformation of the torsion shaft 28.

In this way, the load at the time when the torsion shaft 28 torsionally deforms (i.e., the so-called "force limiter load") can be stabilized. Moreover, basically, the pretensioner 50 and the lock mechanism 80 are merely disposed at the leg plate 18 side. Therefore, special machining or the like of the respective structural members of the pretensioner 50 and the lock mechanism 80 is not needed, and costs can be reduced.

Note that, in the present embodiment, the pretensioner 50 is disposed adjacent to the leg plate 18 of the frame 12, and the lock mechanism 80 is provided at the side of the pretensioner 50 opposite the side at which the leg plate 18 is located. However, for example, the lock mechanism 80 may be disposed adjacent to the leg plate 18 of the frame 12, and the pretensioner 50 may be disposed at the side of the lock mechanism 80 opposite the side at which the leg plate 18 is located.

As described above, the webbing retractor relating to the present invention can, at a low cost, stabilize the force limiter load.

What is claimed is:

1. A webbing retractor used in a seat belt device of a vehicle, the webbing retractor comprising:
    a frame;
    a webbing;
    a sensor for sensing an emergency condition of said vehicle;
    a spool to which one end of the webbing is fixed, and which is rotatably mounted at both ends to said frame and can rotate in a webbing take-up direction and in a webbing pull-out direction which is opposite to the webbing take-up direction;
    a torsion shaft, a first end of which is fixed to one axial direction end side of the spool;
    a pretensioner connected to a second end of the torsion shaft by way of a coupling mechanism, and that operates to wind said webbing in a webbing take up direction in response to a preselected emergency condition, and
    a lock mechanism that is connected to said sensor and that includes a moveable lock plate operating to releasably lock rotational movement of said torsion bar relative to said frame during either said sensed emergency condition or said preselected emergency condition that operates said pretensioner, wherein said lock mechanism releasably locks only the second end of the torsion shaft such that the first end of the torsion shaft remains unlocked and rotation of the spool in the webbing pull-out direction is restricted only at the second end of the torsion shaft, and wherein all of the lock mechanism is provided only at a side of the spool where the pretensioner is provided, and wherein said lock mechanism is mechanically independent from said coupling mechanism and said spool.

2. The webbing retractor of claim 1, wherein the spool has a coaxial through hole.

3. The webbing retractor of claim 1, wherein the torsion shaft is disposed in a through hole of the spool.

4. The webbing retractor of claim 1, wherein said first end of the torsion shaft is fixed to the spool via a sleeve.

5. The webbing retractor of claim 1, wherein the second end of the torsion shaft is able to rotate, by a predetermined amount, relative to said one end side of the spool.

6. The webbing retractor of claim 1, wherein the pretensioner includes a pinion connected to the second end of the torsion shaft.

7. The webbing retractor of claim 6, wherein the pretensioner rotates the pinion in the take-up direction when the vehicle is in a state of rapid deceleration.

8. The webbing retractor of claim 1, wherein, when the vehicle is in a state of rapid deceleration, the lock mechanism does one of directly and indirectly locking only said second end of the torsion shaft, and impeding rotation of the torsion shaft in the webbing pull-out direction.

9. The webbing retractor of claim 1, wherein the lock mechanism and the pretensioner are disposed at a second end side of the spool.

10. The webbing retractor of claim 1, wherein the lock mechanism, the pretensioner, and the spool are disposed in that order.

11. The webbing retraction of claim 1, wherein the lock mechanism is connected to the second end of the torsion shaft.

12. A webbing retractor used in a seat belt device of a vehicle, the webbing retractor comprising:
- a sensor for sensing an emergency condition of said vehicle;
- a webbing;
- a spool to which one end of the webbing is fixed, and which can rotate in a webbing take-up direction and in a webbing pull-out direction which is opposite to the webbing take-up direction;
- a torsion shaft, a first end of which is fixed to one axial direction end side of the spool;
- a pretensioner connected to a second end of the torsion shaft by way of a coupling mechanism, and that operates to wind said webbing in a webbing take up direction in response to a preselected emergency condition, and
- a lock mechanism that releasably locks only the second end of the torsion shaft when the vehicle experiences a sudden deceleration to prevent the pretensioner from rotating in response to the twisting of the torsion shaft during absorption of the pull-out forces such that twisting of the torsion shaft is not affected by the pretensioner, wherein said lock mechanism includes a moveable lock plate operating to releasably lock rotational movement of said torsion shaft relative to said frame during either a sensed emergency condition or said preselected emergency condition that operates said pretensioner, and wherein said lock mechanism is mechanically independent from said coupling mechanism and said spool.

13. A webbing retractor used in a seat belt device of a vehicle, the webbing retractor comprising:
- a sensor for sensing an emergency condition of said vehicle;
- a webbing;
- a spool to which one end of the webbing is fixed, and which can rotate in a webbing take-up direction and in a webbing pull-out direction which is opposite to the webbing take-up direction;
- a torsion shaft, a first end of which is fixed to one axial direction end side of the spool;
- a pretensioner connected to a second end of the torsion shaft by way of a coupling mechanism and operable in response to a preselected emergency condition, and
- a lock mechanism means for releasably locking only the second end of the torsion shaft when the vehicle experiences a sudden deceleration to prevent the pretensioner from rotating in response to the twisting of the torsion shaft during absorption of the pull-out forces such that twisting of the torsion shaft is not affected by the pretensioner, wherein said lock mechanism means is mechanically independent from said coupling mechanism and said spool, and wherein said lock mechanism means includes a moveable Jock plate operating to releasably lock rotational movement of said torsion shaft relative to said frame during either a sensed emergency condition or said preselected emergency condition that operates said pretensioner.

* * * * *